United States Patent [19]

Hecht et al.

[11] Patent Number: 5,142,686
[45] Date of Patent: Aug. 25, 1992

[54] MULTIPROCESSOR SYSTEM HAVING PROCESSORS AND SWITCHES WITH EACH PAIR OF PROCESSORS CONNECTED THROUGH A SINGLE SWITCH USING LATIN SQUARE MATRIX

[75] Inventors: Richard Hecht, Bloomfield; Robert E. LaBarre, Willington, both of Conn.

[73] Assignee: United Technologies Corporation, Hartford, Conn.

[21] Appl. No.: 424,776

[22] Filed: Oct. 20, 1989

[51] Int. Cl.⁵ ................................ G06F 7/38
[52] U.S. Cl. ........................ 395/800; 395/325; 340/825.89; 364/280; 364/242.94
[58] Field of Search ............... 395/325, 800; 390/825.79, 825.80, 825.85, 825.89; 364/736; 382/41

[56] References Cited

U.S. PATENT DOCUMENTS

| | | | |
|---|---|---|---|
| 4,065,808 | 12/1977 | Schomberg et al. | 395/325 |
| 4,177,514 | 12/1979 | Rupp | 395/800 |
| 4,293,735 | 10/1981 | Duret | 340/825.89 |
| 4,523,273 | 6/1985 | Adams, III et al. | 395/800 |
| 4,604,693 | 8/1986 | Chadima, Jr. et al. | 364/200 |
| 4,644,496 | 2/1987 | Andrews | 395/800 |
| 4,709,327 | 11/1987 | Hillis et al. | 364/200 |
| 4,720,854 | 1/1988 | Sand | 379/269 |
| 4,811,210 | 3/1989 | McAulay | 395/325 |
| 4,811,333 | 3/1989 | Rees | 340/825.8 |
| 4,855,903 | 8/1989 | Carleton et al. | 395/325 |
| 4,922,418 | 5/1990 | Doleck | 364/736 |
| 4,991,168 | 2/1991 | Richards | 340/825.8 |
| 5,041,971 | 8/1991 | Carvey et al. | 395/800 |

Primary Examiner—Thomas C. Lee
Assistant Examiner—Mehmet Geckil

[57] ABSTRACT

A multiprocessor computing system having a plurality of processors 11–23 and a plurality of switches 31–43 is interconnected such that a single one of said switches 31–43 is between any pair of said processors 11–23.

1 Claim, 5 Drawing Sheets fig.2

SWITCHES

|    | 31 | 32 | 33 | 34 | 35 | 36 | 37 | 38 | 39 | 40 | 41 | 42 | 43 |
|----|----|----|----|----|----|----|----|----|----|----|----|----|----|
| 11 | 1  | 1  | 1  | 1  | 0  | 0  | 0  | 0  | 0  | 0  | 0  | 0  | 0  |
| 12 | 1  | 0  | 0  | 0  |    |    |    |    |    |    |    |    |    |
| 13 | 1  | 0  | 0  | 0  | M(0,1) | | | M(0,2) | | | M(0,3) | | |
| 14 | 1  | 0  | 0  | 0  |    |    |    |    |    |    |    |    |    |
| 15 | 0  |    |    |    |    |    |    |    |    |    |    |    |    |
| 16 | 0  | M(1,0) | | | M(1,1) | | | M(1,2) | | | M(1,3) | | |
| 17 | 0  |    |    |    |    |    |    |    |    |    |    |    |    |
| 18 | 0  |    |    |    |    |    |    |    |    |    |    |    |    |
| 19 | 0  | M(2,0) | | | M(2,1) | | | M(2,2) | | | M(2,3) | | |
| 20 | 0  |    |    |    |    |    |    |    |    |    |    |    |    |
| 21 | 0  |    |    |    |    |    |    |    |    |    |    |    |    |
| 22 | 0  | M(3,0) | | | M(3,1) | | | M(3,2) | | | M(3,3) | | |
| 23 | 0  |    |    |    |    |    |    |    |    |    |    |    |    |

PROCESSORS

45 fig.5

SWITCHES

|    | 31 | 32 | 33 | 34 | 35 | 36 | 37 | 38 | 39 | 40 | 41 | 42 | 43 |
|----|----|----|----|----|----|----|----|----|----|----|----|----|----|
| 11 | 1  | 1  | 1  | 1  | 0  | 0  | 0  | 0  | 0  | 0  | 0  | 0  | 0  |
| 12 | 1  | 0  | 0  | 0  | 1  | 1  | 1  | 0  | 0  | 0  | 0  | 0  | 0  |
| 13 | 1  | 0  | 0  | 0  | 0  | 0  | 0  | 1  | 1  | 1  | 0  | 0  | 0  |
| 14 | 1  | 0  | 0  | 0  | 0  | 0  | 0  | 0  | 0  | 0  | 1  | 1  | 1  |
| 15 | 0  | 1  | 0  | 0  |    |    |    |    |    |    |    |    |    |
| 16 | 0  | 1  | 0  | 0  | M(1,1) | | | M(1,2) | | | M(1,3) | | |
| 17 | 0  | 1  | 0  | 0  |    |    |    |    |    |    |    |    |    |
| 18 | 0  | 0  | 1  | 0  |    |    |    |    |    |    |    |    |    |
| 19 | 0  | 0  | 1  | 0  | M(2,1) | | | M(2,2) | | | M(2,3) | | |
| 20 | 0  | 0  | 1  | 0  |    |    |    |    |    |    |    |    |    |
| 21 | 0  | 0  | 0  | 1  |    |    |    |    |    |    |    |    |    |
| 22 | 0  | 0  | 0  | 1  | M(3,1) | | | M(3,2) | | | M(3,3) | | |
| 23 | 0  | 0  | 0  | 1  |    |    |    |    |    |    |    |    |    |

PROCESSORS

45 fig. 6

SWITCHES

| | | 31 | 32 | 33 | 34 | 35 | 36 | 37 | 38 | 39 | 40 | 41 | 42 | 43 |
|---|---|---|---|---|---|---|---|---|---|---|---|---|---|---|
| P R O C E S S O R S | 11 | 1 | 1 | 1 | 1 | 0 | 0 | 0 | 0 | 0 | 0 | 0 | 0 | 0 |
| | 12 | 1 | 0 | 0 | 0 | 1 | 1 | 1 | 0 | 0 | 0 | 0 | 0 | 0 |
| | 13 | 1 | 0 | 0 | 0 | 0 | 0 | 0 | 1 | 1 | 1 | 0 | 0 | 0 |
| | 14 | 1 | 0 | 0 | 0 | 0 | 0 | 0 | 0 | 0 | 0 | 1 | 1 | 1 |
| | 15 | 0 | 1 | 0 | 0 | 1 | 0 | 0 | 1 | 0 | 0 | 1 | 0 | 0 |
| | 16 | 0 | 1 | 0 | 0 | 0 | 1 | 0 | 0 | 1 | 0 | 0 | 1 | 0 |
| | 17 | 0 | 1 | 0 | 0 | 0 | 0 | 1 | 0 | 0 | 1 | 0 | 0 | 1 |
| | 18 | 0 | 0 | 1 | 0 | 1 | 0 | 0 | 0 | 0 | 1 | 0 | 1 | 0 |
| | 19 | 0 | 0 | 1 | 0 | 0 | 1 | 0 | 1 | 0 | 0 | 0 | 0 | 1 |
| | 20 | 0 | 0 | 1 | 0 | 0 | 0 | 1 | 0 | 1 | 0 | 1 | 0 | 0 |
| | 21 | 0 | 0 | 0 | 1 | 1 | 0 | 0 | 0 | 1 | 0 | 0 | 0 | 1 |
| | 22 | 0 | 0 | 0 | 1 | 0 | 1 | 0 | 0 | 0 | 1 | 1 | 0 | 0 |
| | 23 | 0 | 0 | 0 | 1 | 0 | 0 | 1 | 1 | 0 | 0 | 0 | 1 | 0 |

~45 fig. 7

SWITCHES

| | | 31 | 32 | 33 | 34 | 35 | 36 | 37 | 38 | 39 | 40 | 41 | 42 | 43 |
|---|---|---|---|---|---|---|---|---|---|---|---|---|---|---|
| P R O C E S S O R S | 11 | | | | | | | | | | | | | |
| | 12 | | | | | | | | | | | | | |
| | 13 | | | | | | | | | | | | | |
| | 14 | | | | | | | | | | | | | |
| | 15 | | 1 | 0 | 0 | 1 | 0 | 0 | 1 | 0 | 0 | 1 | 0 | 0 |
| | 16 | | 1 | 0 | 0 | 0 | 1 | 0 | 0 | 1 | 0 | 0 | 1 | 0 |
| | 17 | | 1 | 0 | 0 | 0 | 0 | 1 | 0 | 0 | 1 | 0 | 0 | 1 |
| | 18 | | 0 | 1 | 0 | 1 | 0 | 0 | 0 | 0 | 1 | 0 | 1 | 0 |
| | 19 | | 0 | 1 | 0 | 0 | 1 | 0 | 1 | 0 | 0 | 0 | 0 | 1 |
| | 20 | | 0 | 1 | 0 | 0 | 0 | 1 | 0 | 1 | 0 | 1 | 0 | 0 |
| | 21 | | 0 | 0 | 1 | 1 | 0 | 0 | 0 | 1 | 0 | 0 | 0 | 1 |
| | 22 | | 0 | 0 | 1 | 0 | 1 | 0 | 0 | 0 | 1 | 1 | 0 | 0 |
| | 23 | | 0 | 0 | 1 | 0 | 0 | 1 | 1 | 0 | 0 | 0 | 1 | 0 |

~47

MULTIPROCESSOR SYSTEM HAVING PROCESSORS AND SWITCHES WITH EACH PAIR OF PROCESSORS CONNECTED THROUGH A SINGLE SWITCH USING LATIN SQUARE MATRIX

DESCRIPTION

1. Technical Field

This invention relates to multiprocessor computer architecture and more particularly to interconnecting large numbers of processors within a multiprocessor computing system.

2. Background Art

A computing system having a plurality of cooperating processors (multiprocessor system) overcomes many of the performance limitations of single processor computing systems. However, a multiprocessor system must provide for some type of interconnection between the processors in order to facilitate interprocessor data communication.

Processors within a multiprocessor system can be connected indirectly so that data sent from one processor to another may have to be forwarded by one or more intermediate processors. For example, U.S. Pat. No. 4,598,400 entitled "Method and Apparatus for Routing Message Packets" (Hillis) discloses a multiprocessor system having many processors connected in an N dimensional grid.

Indirectly connecting processors is acceptable for systems in which the amount of communication between remote processors can be minimized, such as in systems designed to solve specific problems. For more generic computing systems, however, indirect processor connection will only increase system overhead as more and more intermediate processors are used to forward messages. Therefore, a directly connected system, in which every processor can communicate with every other processor, is desirable.

One method for directly interconnecting processors is to connect all of the processors and some memory to a single bus. When one processor wants to send a message to another processor, the sending processor uses the bus to write the message to the memory. The receiving processor receives the message by using the bus to read the memory.

Since only one processor can have access to the bus at any given time, however, this method is impractical unless there are a very small number of processors or there is very little interprocessor communication. Otherwise, the single bus becomes a communication bottleneck and the processors spend too much time waiting for access to the bus.

Another way to interconnect multiple processors is a star network, wherein all of the processors are connected to a central switch, which channels data from one processor to another like a railroad switch channels trains from one track to another. Connections from sending processors to receiving processors are dynamically made as required. A drawback to the star network is that only one connection to any receiving processor can exist at any given time. If two or more processors try to send a message to the same processor at the same time, all of the sending processors, except the one which is connected, must wait.

A device which has somewhat overcome the temporal connection problem of star networks is described in U.S. Pat. No. 4,623,996 entitled "Packet Switched Multiple Queue NMX Switch Node and Processing Method" (McMillen), wherein sent messages are accepted immediately by the central switch and stored in queues which are internal to the device. However, even though the invention eliminates the wait for connection time for a sending processor, message delays still occur because a message will remain in a queue inside the device until the device services the queue.

Another difficulty with the star network is that, because the central switch needs a port (i.e. a set of dedicated I/0 pins) for each processor in the system, increasing the number of processors causes the number of ports required for the central switch to increase. Practical considerations related to the maximum number of pins on a device, therefore, limit the total number of processors which can be interconnected in a star network configuration.

Of course, the ports of a star network central switch can be shared, i.e. multiplexed, by more than one processor. Doing that, however, would substantially decrease average interprocessor message throughput time because another delay, i.e. waiting for use of the port, would be added to the delays which already occur with star networks.

Another multiprocessor connection scheme is the fully connected network wherein every processor is connected to every other processor. Interprocessor message delay is minimized because processors do not have to establish a connection to each other through a central switch. An N processor fully connected network requires $(N*(N-1))/2$ interconnections. This poses no difficulty for multiprocessor systems having a small number of processors. For example, a 5 processor system would require 10 interconnections. Note that, as a rule, properly connecting processors to each other for communication purposes requires a two port switch between each pair of processors. Dual port rams could be employed as switches between pairs of processors in a fully connected network.

A drawback to fully connected networks is that because of the costs associated with each processor interconnection (e.g. the dual port ram, discussed supra) are not small, and because the number of interconnections is roughly proportional to the square of the number of processors, fully connected networks become impractical for systems with large numbers of processors. For example, a 100 processor system would require 4,950 interconnections, nearly 50 times the number of interconnections needed for the 5 processor system.

DISCLOSURE OF INVENTION

Objects of the invention include a multiprocessor computing system, having a switch between every pair of processors, requiring relatively small numbers of both system interconnections and ports per switch.

According to the present invention, a multiprocessor computing system, having a switch between every pair of processors, has connections from processors to switches described by a connectivity matrix which can be formed using orthogonal Latin squares.

The foregoing and other objects, features and advantages of the present invention will become more apparent in light of the following detailed description of exemplary embodiments thereof, as illustrated in the accompanying drawings.

BRIEF DESCRIPTION OF DRAWINGS

FIG. 2 is a connectivity matrix wherein elements within the first row and the first column have been determined.

FIG. 3 is a connectivity matrix wherein elements within the first row and the first column have been determined and the remainder of the matrix has been divided into submatrices.

FIG. 4 is a connectivity matrix wherein elements within the first row, the first column, and one submatrix have been determined.

FIG. 5 is a connectivity matrix wherein elements within the first row, the first column, the first row of submatrices, and the first column of submatrices have been determined.

FIG. 6 is a completed connectivity matrix for a thirteen processor, thirteen switch multiprocessor computing system.

FIG. 7 is a completed connectivity matrix for a nine processor, twelve switch multiprocessor computing system.

BEST MODE FOR CARRYING OUT THE INVENTION

Figure 1:
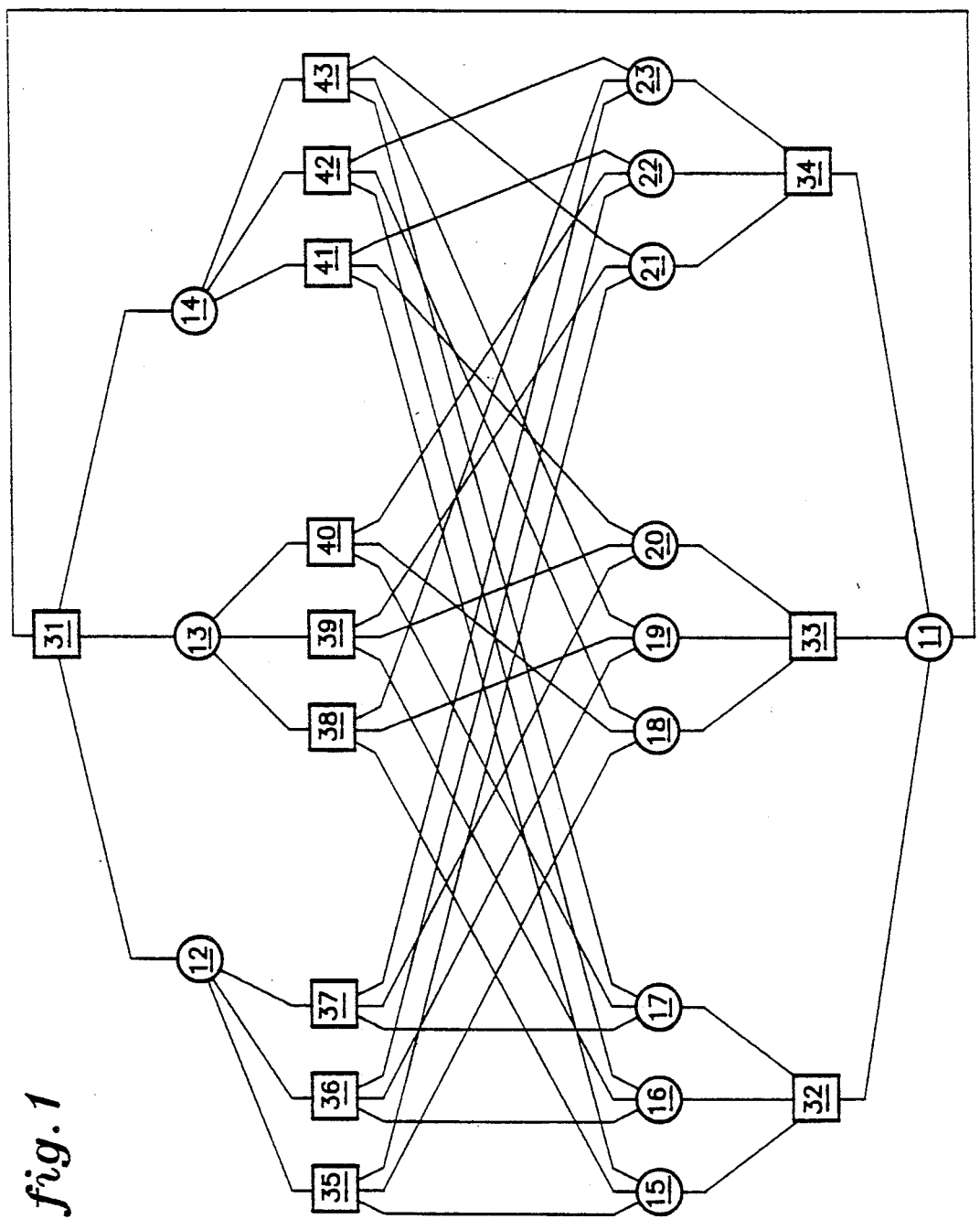
FIG. 1 is a schematic diagram of a thirteen processor computing system wherein every processor is connected to every other processor through a single switch.

Referring to FIG. 1, a thirteen processor multiprocessor computing system is comprised of thirteen processors 11-23 and thirteen multiport switches 31-43 (the term "switch" is used herein in the sense of providing the interconnection between processors). The invention may have a number of processors other than thirteen. The thirteen processor system was chosen for illustrative purposes, however, because a system having more than thirteen processors would have more complexity than necessary for showing the invention and a system having less than thirteen processors would not adequately demonstrate features of the invention. Furthermore, there are not very many ways to interconnect a small number of processors and, therefore, the invention is not defined for systems having only a few processors.

Each of the processors 11-23 is connected to four of the switches 31-43. Each of the switches 31-43 has four ports and is connected to four of the processors 11-23. The interconnections between the processors 11-23 and the switches 31-43 are such that there is only one switch between any two of the processors 11-23. The number of interconnections, fifty two, can be calculated by multiplying the number of processors by the number of connections per processor. Note that a thirteen processor star network would require a central switch with thirteen ports rather than four while a thirteen processor fully connected network would require seventy-eight interconnections rather than fifty-two.

The switches 31-43, which route data communicated between the processors 11-23, can be implemented using conventional multiport rams. However, a better device to use for the switches 31-43 is a multiport interdevice communication element (MICE), described in a copending, commonly owned, U.S. patent application entitled "Digital Interdevice Communication", Ser. No. 07/424,775 filed contemporaneously herewith. Using MICEs eliminates much of the processor overhead which would exist if multiport rams were employed instead.

The processors 11-23 can be any off the shelf processors or processing units, such as the Motorola MC68000. Connecting four switches to each processor does not necessitate each of the processors 11-23 having four separate ports. Rather, the switches 31-43 may be memory mapped into the address space of the processors 11-23. Memory mapping is a processor interface technique known to those skilled in the art wherein a comparator asserts a signal in response to address signals of the processor equaling a predetermined value. A peripheral device is activated or deactivated in response to said signal. Each port or address space (of a memory mapped processor) is referred to herein as a "connection".

The topology of the connections between the processors 11-23 and the switches 31-43 can be determined by trial and error. However, even for the relatively small thirteen processor multiprocessor computing system of FIG. 1, the task of determining interconnects between processors and switches would be very difficult and time consuming. Furthermore, it may become impractical to attempt by trial and error to interconnect processors and switches for large multiprocessor systems.

The connections for the multiprocessor system of FIG. 1 can be determined mathematically. Referring to FIG. 2, a connectivity matrix 45 has thirteen rows and thirteen columns. Each of the rows corresponds to one of the processors 11-23 and is labeled with a number from eleven to twenty three so that, for example, the row which corresponds to the processor 11 is the row which is preceded by the number eleven. Furthermore, the row which represents the processor 11 is hereinafter designated as row 11. Similarly, each of the columns corresponds to one of the switches 31-43 and is therefore designated by a number from thirty one to forty three.

Each element of the matrix 45 is designated as $E_{i,j}$ where i determines the particular row of the element and j determines the particular column of the element. The range of values for i, 1-13, corresponds to the rows 11-23 respectively. Similarly, the range of values for j, 1-13, corresponds to the columns 31-43 respectively. The value of each of the elements $E_{i,j}$ is set to one if and only if a connection is to be made between a processor represented by the ith row and a switch represented by the jth column. If no connection is to be made, the value of $E_{i,j}$ is set to zero. Note that, since only four connections are made to each of the processors 11-23, there can be no more than four ones in any row of the matrix 45. Similarly, because each of the switches 31-43 has four ports, there can be no more than four ones in any column of the matrix.

FIG. 2 illustrates that the row 11 of the connectivity matrix 45 is completed by connecting the processor 11, to the four switches 31-34. Therefore, the elements $E_{1,1}$, $E_{1,2}$, $E_{1,3}$, and $E_{1,4}$ of the matrix 45 contain ones while the elements $E_{1,5}$ through $E_{1,13}$ contain zeros. Similarly, the column 31 of the connectivity matrix 45 is completed by connecting the switch 31 to the four processors 11-14. Therefore, the elements $E_{1,1}$, $E_{2,1}$, $E_{3,1}$, and $E_{4,1}$ of the matrix 45 contain ones while the elements $E_{5,1}$ through $E_{13,1}$ contain zeros.

In FIG. 3, the remaining portion of the matrix 45 (i.e. the portion of the matrix 45 comprised of the rows 12-23 and the columns 32-43) is subdivided into square submatrices M(0,0) through M(3,3). The order of each of the submatrices will be one less than the number of connections per processor. Therefore, each of the submatrices is a three element by three element square. Two numbers within parenthesis are used to identify each submatrix. The submatrix which is comprised of elements within the lowest order rows 12-14 and the lowest order columns 32-34 of the matrix 45 is designated as submatrix M(0,0). The right most of the two submatrix identification numbers is incremented by one for each submatrix which encompasses higher order columns. Similarly, the left most of the two submatrix identification numbers is incremented by one for each submatrix which encompasses higher order rows. Therefore, the submatrix which encompasses the highest order rows 21-23 and the highest order columns 41-43 is identified as submatrix M(3,3).

Redundant (i.e. wasteful) communication paths between processors occur whenever a pair of processors P1 and P2 are connected via switches S1 and S2 such that P1 is connected to S1 and S2 and P2 is connected to S1 and S2. The path from P1 to P2 through S1 is duplicated by the path from P1 to P2 through S2. The matrix 45 of FIG. 3 indicates that the processors 11-14 are connected to the switches 31-34. Therefore, redundant communication paths can be avoided only if all of the elements of the submatrix M(0,0) are set to zero, as illustrated in FIG. 4.

FIG. 5 illustrates that more default connections between the processors 11-23 and the switches 31-43 can be made by inspection. The processor 12 can be connected to the switches 35-37. The general rule for completing the submatrices M(0,r), where r>0, is that row r of M(0,r) is set to ones while the remaining rows of M(0,r) are set to zeros. Similarly, the columns of the submatrices M(q,0), where q>0, are set to ones while the remaining columns of the M(q,0) submatrices are set to zeros. The values of the remaining elements of the connectivity matrix 45 must be determined analytically.

A Latin square is an nth order (i.e. n×n) matrix wherein each element of the Latin square has a value from 1 through n and wherein no two elements of any row or any column are the same. A first Latin square, A, and a second Latin square, B, are said to be orthogonal if and only if every pair of elements $A_{i,j}$, $B_{i,j}$) is distinct. A complete set of nth order orthogonal Latin squares contains n Latin squares wherein every pair of Latin squares in the set is orthogonal. An nth order complete set of orthogonal Latin squares exists if and only if n is either a prime number (divisible only by itself and one) or a positive integer power of a prime number.

A complete set of third order Latin squares exists because three is a prime number. The complete set of third order orthogonal Latin squares, designated as L(k) where k=1,2,3, is the following:

$$L(1) = \begin{matrix} 1 & 2 & 3 \\ 1 & 2 & 3 \\ 1 & 2 & 3 \end{matrix}$$

$$L(2) = \begin{matrix} 1 & 2 & 3 \\ 2 & 3 & 1 \\ 3 & 1 & 2 \end{matrix}$$

-continued $$L(3) = \begin{matrix} 1 & 2 & 3 \\ 3 & 1 & 2 \\ 2 & 3 & 1 \end{matrix}$$

The remaining elements of the submatrices, designated as $M(q,r)_{i,j}$, are determined by the following rules:

$$M(q,r)_{i,j} = 1 \text{ if and only if } L(r)_{q,j} = i$$

and $$M(q,r)_{i,j} = 0 \text{ if and only if } L(r)_{q,j} \neq i$$

As an example, this rule can be used to determine some of the elements of the submatrix M(2,3). Note that since r=3, only the L(3) Latin square will be used.

$M(2,3)_{1,1}$ equals 0 because $L(3)_{2,1}$ equals 3 which does not equal i (i=1). $M(2,3)_{2,1}$ equals 0 because $L(3)_{2,1}$ equals 3 which also does not equal i (i=2). However, $M(2,3)_{3,1}$ equals 1 because $L(3)2,1$ equals 3 which does equal i. The remainder of M(2,3) can be determined in a similar fashion along with the contents of the other submatrices.

FIG. 6 illustrates the completed connectivity matrix 45. Note that there are no more than four processors connected to each switch and that there are no more than four switches connected to each processor. Further note that the number connections for the system, fifty-two, equals the number of ones in the matrix.

A second connectivity matrix 47 can be constructed by eliminating the rows 11-14 and the column 31 from the matrix 45 of FIG. 6. The matrix 47 describes a nine processor, twelve switch system formed by removing the processors 11-14 and the switch 31 from FIG. 1. Note that there are three, instead of four, connections to each of the switches 32-43 so that the switches 32-43 need only have three, instead of four, ports. Each of the processors 15-23, however, are still connected to four of the switches 32-43. Also note that the number of interconnections for the system, thirty six, can be calculated by multiplying the number of connections per processor, four, by the number of processors, nine. There are thirty six ones in the connectivity matrix 47. The matrix 47 is defined to be "related" to the matrix 45 because the matrix 47 is derived directly from the matrix 45.

Even though the invention is illustrated as having either thirteen processors or nine processors, the mathematical rules used to construct the connectivity matrices 45,47 can be generalized and hence used to form much larger connectivity matrices for much larger systems.

A multiprocessor system having a number of processors which equals the number of switches, such as the system illustrated in FIG. 1, is a balanced multiprocessor system. The connectivity matrix for a balanced multiprocessor system can be used to form a connectivity matrix for a non-balanced multiprocessor system (i.e. a system having a different number of processors as switches). A balanced multiprocessor system and a non-balanced multiprocessor systems formed therefrom are "related" systems. For example, the systems described by the connectivity matrix 45 and the matrix 47 are related systems.

Let the set Y={$y_1$, $y_2$, ... $y_k$, ...} where $y_1$ equals four, $y_2$ equals the next higher integer wherein the integer minus one is a prime number or a positive integer power of a prime number (five in this case), and $y_k$ equals the kth element of the series of integers wherein one minus each integer is a prime number or a positive integer power of a prime number. The kth (where k is any integer) balanced multiprocessor system, having $N_k$ processors, $N_k$ switches, $P_k$ connections per processor, $P_k$ ports per switch, and $N_k \times P_k$ interconnections exists if and only if $N_k$ satisfies the following equation (EQ. 1):

$$N_k = y_k \times (y_k - 1) + 1$$

$P_k$, the number of connections per processor, equals $y_k$. As an example, for the balanced multiprocessor system of FIG. 1, $k=1$ and $y_k = y_1 = 4$. Therefore:

$$N_1 = y \times (y_1 - 1) + 1$$

$$N_1 = 4 \times (4-1) + 1$$

$$N_1 = 13$$

$P_1$, the number of connections per processor and the number of ports per switch, equals $y_1$ which is four in this case.

For the kth balanced system, the connectivity matrix for the kth related non-balanced system is formed by eliminating the first column and the first $P_k$ rows of the balanced connectivity matrix (as in FIG. 7). The resulting system has $P_k$ less processors and one less switch. The remaining switches have $P_k - 1$ ports per switch.

For example, the non-balanced system for k=1 is illustrated by the connectivity matrix 47 (FIG. 7) which is formed by eliminating the first column, and the first $P_1$ (i.e. four) rows of the matrix 45. The resulting system has one less switch, $P_1$ (four) less processors, and the remaining switches have $P_1 - 1$ (three) ports per switch.

Figure 8:
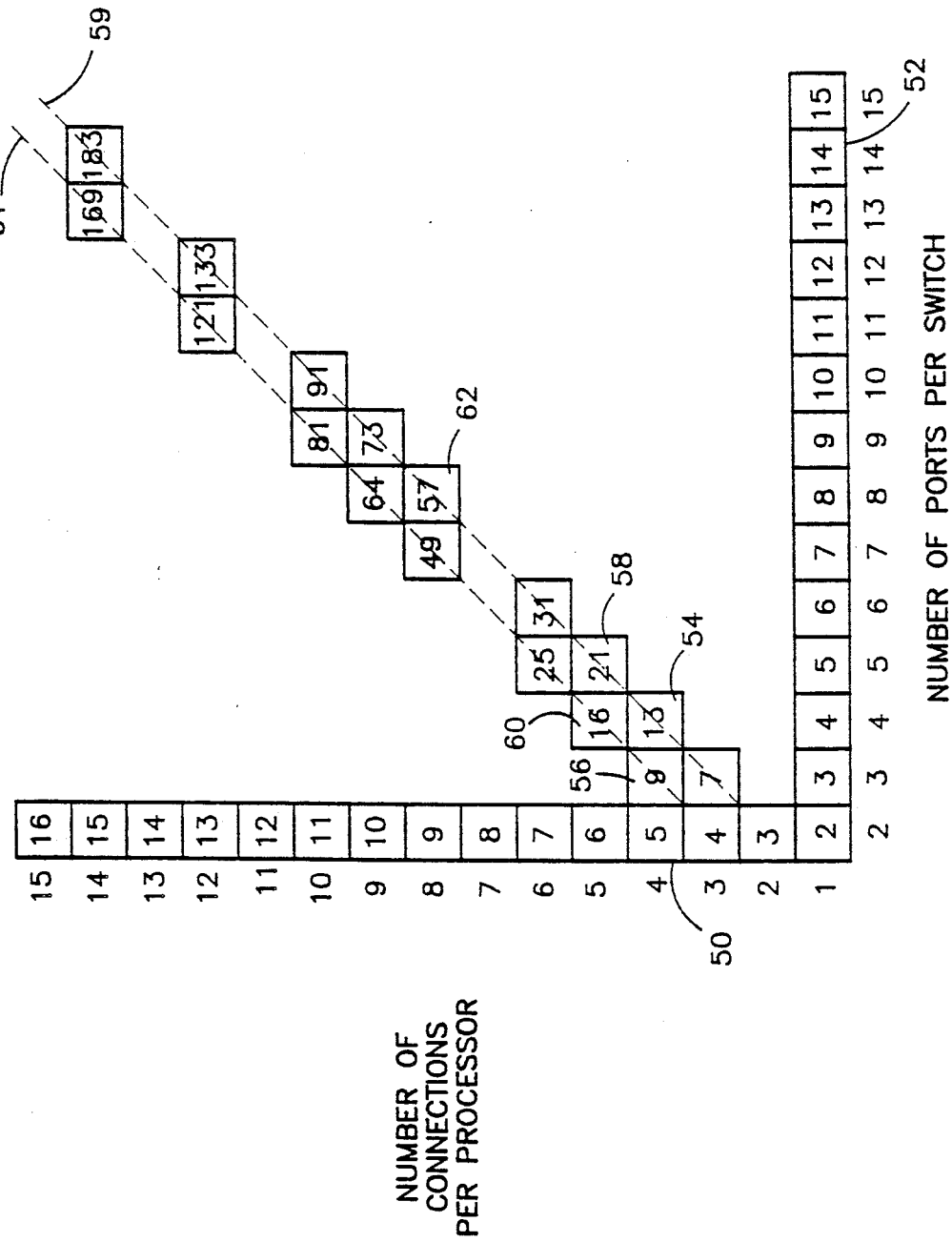
FIG. 8 is a table illustrating the relationship between number of processors, connections per processor, and ports per switch for various multiprocessor systems incorporating the invention.

FIG. 8 is a table which graphically illustrates the relationship between the number of connections per processor, the number of ports per switch, and the number of processors for various multiprocessor systems including star networks, fully connected networks, and the invention. A vertical axis 50 represents the number of connections per processor. A horizontal axis 52 represents the number of ports per switch. The maximum possible number of processors for a given system is written within boxes in the table. Fully connected networks having from two to sixteen processors are represented in boxes along the vertical axis 50. Star networks having from two to fifteen processors are represented in boxes along the horizontal axis 52.

The balanced system of FIG. 1 having four ports per switch, four connections per processor, thirteen switches, and thirteen processors is shown in a box 54. Note that the box 54 represents neither a fully connected network nor a star network. A box 56 represents a system having four connections per processor, three ports per switch, and nine processors (i.e. the system for the connectivity matrix 47). The systems represented by the boxes 54,56 are the k=1 balanced and non-balanced, respectively, related systems.

A box 58 illustrates that a balanced system for twenty-one processors can be constructed using five connections per processor and five ports per switch. A balanced diagonal 59 extending from the box 54 through the box 58 intersects all boxes which represent balanced systems. Furthermore, the balanced system diagonal 59 does not intersect any boxes which represent non-balanced systems. Note that there is no box for representing a system having seven connections per processor and seven ports per switch. This is because seven minus one equals six which is neither a prime number nor a power of a prime number. Other gaps along the balanced diagonal 59 (and beyond) exist for the same reason.

A box 60 represents a system having five connections per processor, four ports per switch, twenty switches, and sixteen processors. The system represented by the box 60 is the non-balanced system which is related to the balanced system represented by the box 58. A non-balanced diagonal 61 extends from the box 56 through the box 60. Boxes along the non-balanced diagonal 61 represent non-balanced systems. Note that each of the non-balanced systems represented in FIG. 8 is derived from, and related to, a balanced system having the same number of connections per processor. Therefore, there are gaps along the non-balanced diagonal 61 (and beyond) which correspond to gaps along the balanced diagonal 59.

A multiprocessor system can be formed having a number of processors different from the numbers of processors shown in systems represented by boxes of in FIG. 8. Such systems are formed by first creating a system having a theoretical maximum number of processors greater than the desired number of processors (i.e. an ideal system). Processors are then removed from the system until the desired number of processors is reached. For example, a fifty processor system can be constructed by removing seven processors from an ideal fifty seven processor system (a k=4 system represented by a box 62 of FIG. 8).

However, removing a large number of processors would deviate from the invention. For example, removing fifty six processors from a fifty seven processor system would result in a single processor system, which is not part of the invention.

Therefore, the invention is practiced only when the number of processors in a balanced system is greater than $N_{k-1}$ and less than or equal to $N_k$ where $N_k$ is the kth balanced multiprocessor system having a maximum of $y_k$ connections per processor. An example would be a balanced multiprocessor system having between thirty two and fifty seven processors wherein each processor is connected to a maximum of eight switches. Similarly, the number of processors in a non-balanced system is greater than $N_{k-1} - Y_{k-1}$ and less than or equal to $N_k - Y_k$. An example would be a non-balanced multiprocessor system having between twenty six and forty nine processors.

Once $P_k$ and $N_k$ (hereinafter referred to as P and N, respectively) have been determined, an $N \times N$ connectivity matrix can be constructed. Note that if a non-balanced system is desired, the $N \times N$ connectivity matrix can be used to construct the $(N-1) \times (N-P)$ connectivity matrix for the non-balanced system.

The elements of the first row, $E_{1,j}$, are determined by the formulas:

$$E_{1,j} = 1 \text{ for } j = 1, \ldots P$$

and $$E_{1,j} = 0 \text{ for } j = P+1, \ldots N$$

Similarly, the elements of the first column, $E_{i,1}$, are determined by the formulas:

$$E_{i,1}=1 \text{ for } i=1,\ldots,P$$

and $$E_{i,1}=0 \text{ for } i=P+1,\ldots,N$$

The remainder of the connectivity matrix is divided into $P^2$ submatrices, $M(0,0)$ through $M(P-1,P-1)$ where each submatrix is $(P-1)\times(P-1)$ elements in size and the elements of the connectivity matrix encompassed by each submatrix are indicated by the formula:

$$M(q,r)_{i,j}=E_{q\times(P-1)+1+i,\,r\times(P-1)+1+j}$$

Once the connectivity matrix has been divided into submatrices, all of the elements of submatrix $M(0,0)$ are set to zeros. The elements of the first row of submatrices, except submatrix $M(0,0)$, are determined by the following formulas:

$$M(0,r)_{i,j}=1 \text{ for } i=r$$

and $$M(0,r)_{i,j}=0 \text{ for } i\neq r$$

Similarly, the elements of the first column of submatrices, except the submatrix $M(0,0)$, are determined by the following formulas:

$$M(q,0)_{i,j}=1 \text{ for } i=q$$

and $$M(q,0)_{i,j}=0 \text{ for } i\neq q$$

The next step requires the generation of a complete set of $P-1$ orthogonal Latin squares (designated as $L(1), L(2), \ldots L(P-1)$) of order $P-1$. Such a set exists if and only if the quantity $P-1$ is a prime number or a positive integer power of a prime number. How to construct a complete set of orthogonal Latin squares is known in the art: see for example Chapter 7 (entitled "Orthogonal Latin Squares") of Combinatorial Mathematics, H. J. Ryser, Vol. 14 of Carus Mathematical Monographs, pub. and dist. by the Mathematical Association of America, printed by Quinn and Boden Co. Inc. Rahway N.J. (1963). Latin squares are used to determine the elements of the remaining submatrices by the following formulas:

$$M(q,r)_{i,j}=1 \text{ if } L(r)_{q,j}=i$$

and $$M(q,r)_{i,j}=0 \text{ if } L(r)_{q,j}\neq i \text{ } q,j$$

A non-balanced connectivity matrix for an $N-P$ processor, $N-1$ switch system can be formed by eliminating the first column and the first P rows of the N processor N switch connectivity matrix. The remaining processors still have P connections while the remaining switches have $S=P-1$ ports.

Once the connectivity matrix has been determined, processors may be eliminated if the desired number of processors is different from the number for an ideal balanced or non-balanced system. In other words, referring to FIG. 8, a system having between thirty-two and fifty-seven processors can be constructed by removing processors from a balanced system having fifty-seven processors.

Even though the vertical axis 50 and the horizontal axis 52 of the table of FIG. 8 go no higher than fifteen, there is no restriction on the maximum number of processors in the invention, since there is no maximum prime number or number which is an integer power of a prime number.

Although the invention has been shown and described with respect to exemplary embodiments thereof, it should be understood by those skilled in the art that various changes, omissions and additions may be made therein and thereto, without departing from the spirit and the scope of the invention.

I claim:

1. A multiprocessor system, comprising:
   a plurality of processors; and
   a plurality of switches;
   each of said processors being connected through a single one of said switches to each other one of said processors, said multiprocessor system having a number of processors N or M, where
   N is between $N_{k-1}+1$ and $N_k$, for a balanced system, and
   M is between $N_{k-1}-Y_{k-1}+1$ and $N_k-Y_k$, for a non-balanced system and
   k is any positive integer, and
   $N_0=7$ and $Y_0=3$, and
   $N_k=y_k\times(Y_k-1)+1$, where
   $y_k$ is selected from the set y, where
   $Y=\{y_1, y_2, \ldots y_k, \ldots\}$, where
   $y_1=$ four and $y_2=$ five and
   and $y_k=$ the kth member of the set Y, which is the set of all integers, in increasing order, which are one greater than a prime number or one greater than a positive integer power of a prime number,
   each processor has at least $y_0$ connections and no more than $y_k$ connections to related ones of said switches,
   each switch has at least $y_0$ connections and no more than $y_k$ connections to related ones of said processors in an N processor balanced multiprocessor system, and
   each switch has at least $y_0$ connections and no more than $y_k-1$ connections to related ones of said processors in an M processor non-balanced multiprocessor system.

* * * * *